Jan. 25, 1938.  L. H. BROWNE  2,106,401
MOTOR CAR CONTROL DEVICE
Original Filed Oct. 16, 1931  4 Sheets-Sheet 1
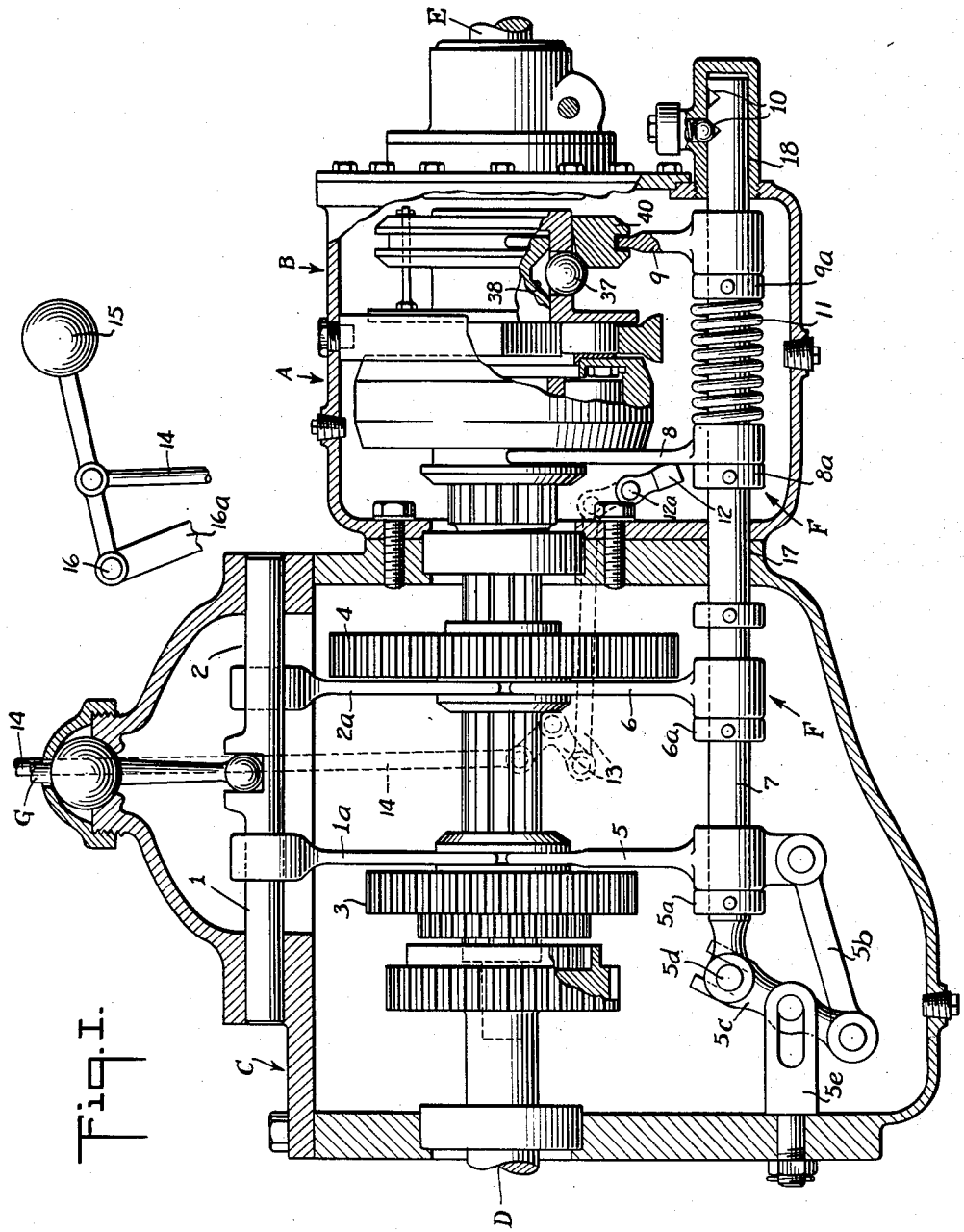
Fig. I.
INVENTOR
Lindsay H. Browne
BY
his ATTORNEY

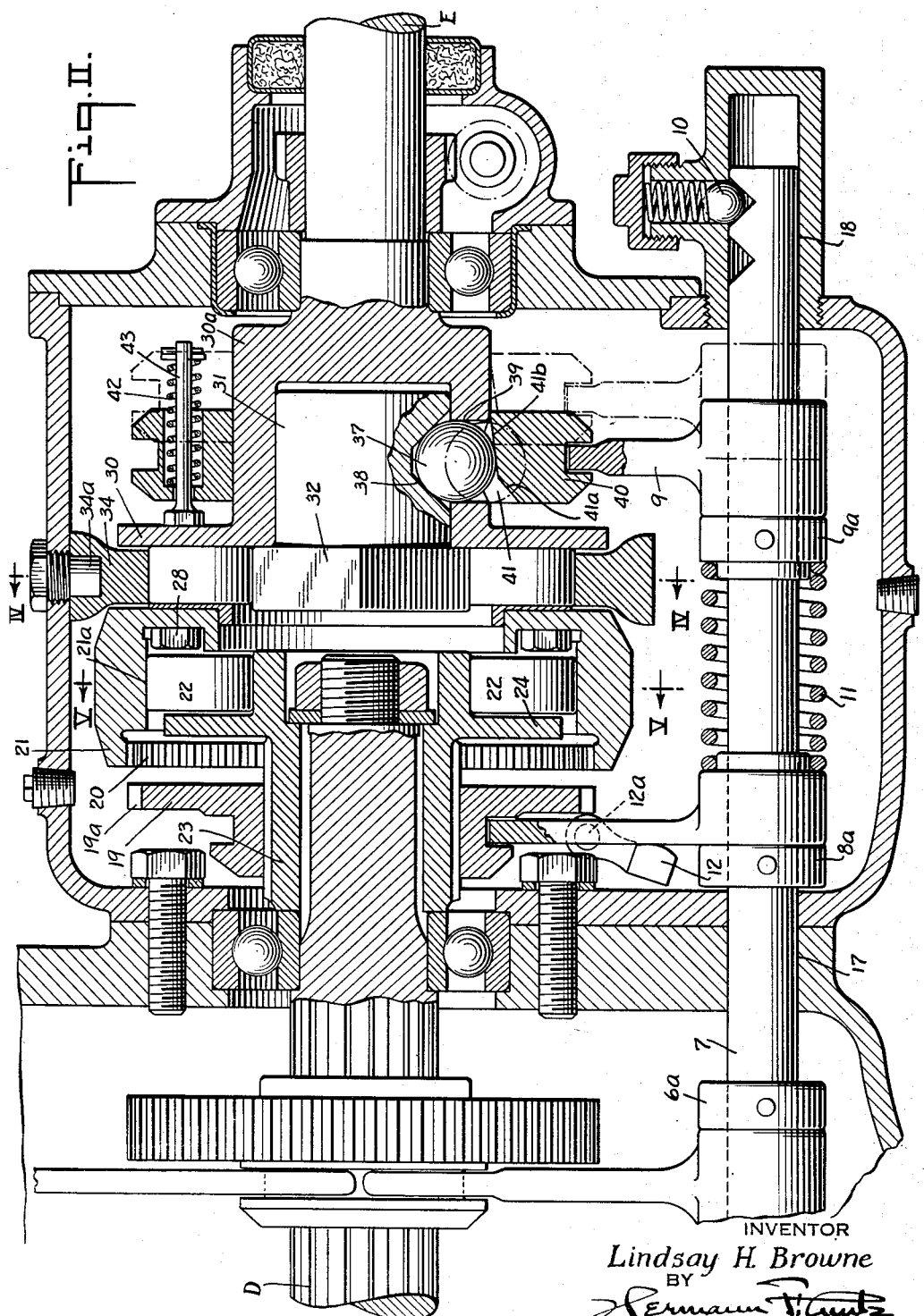

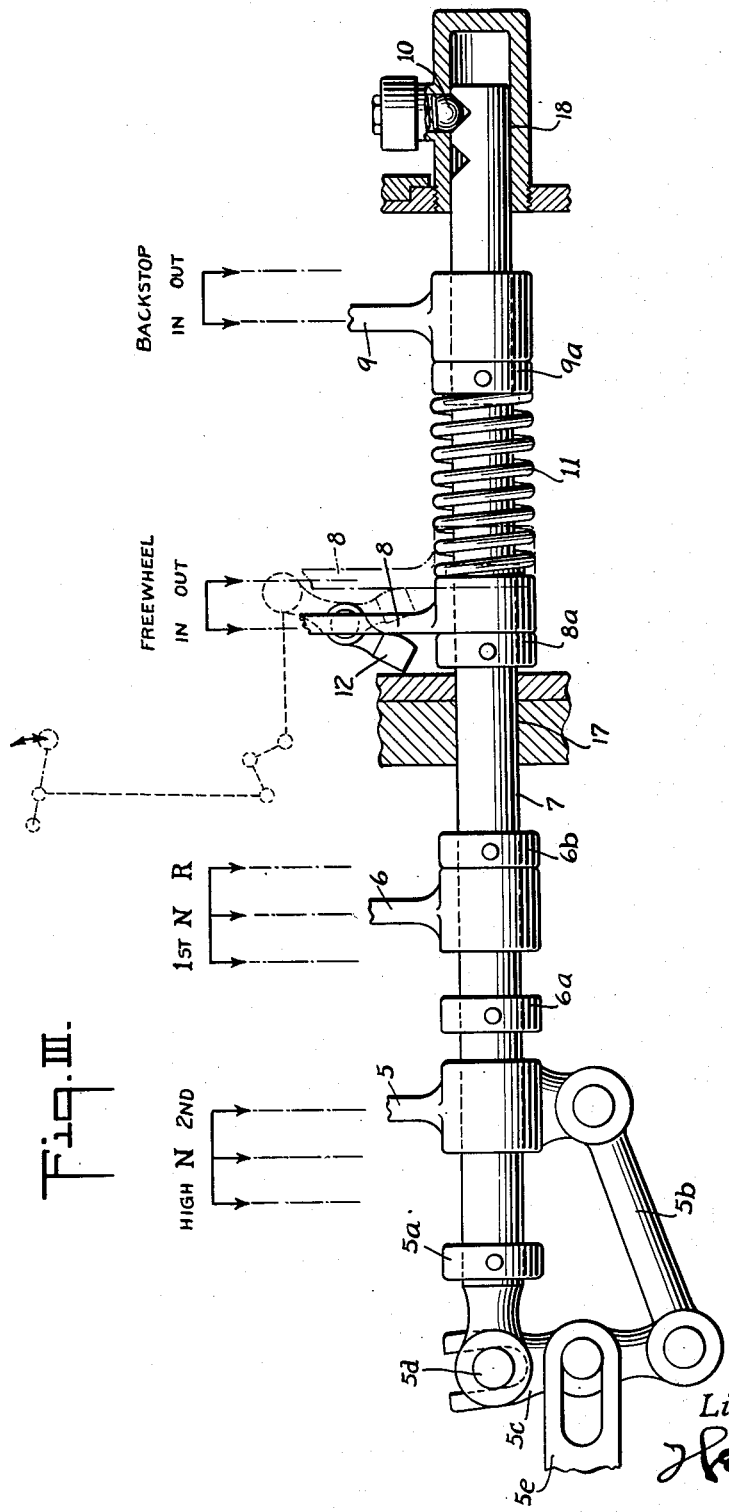

Jan. 25, 1938.    L. H. BROWNE    2,106,401
MOTOR CAR CONTROL DEVICE
Original Filed Oct. 16, 1931    4 Sheets-Sheet 4
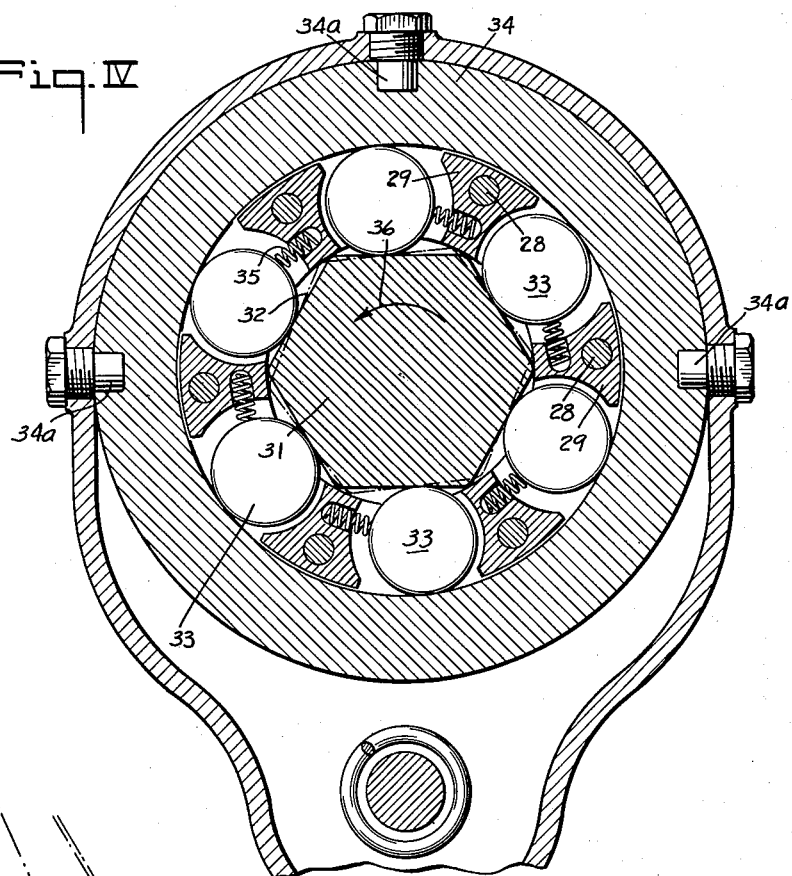
Fig. IV
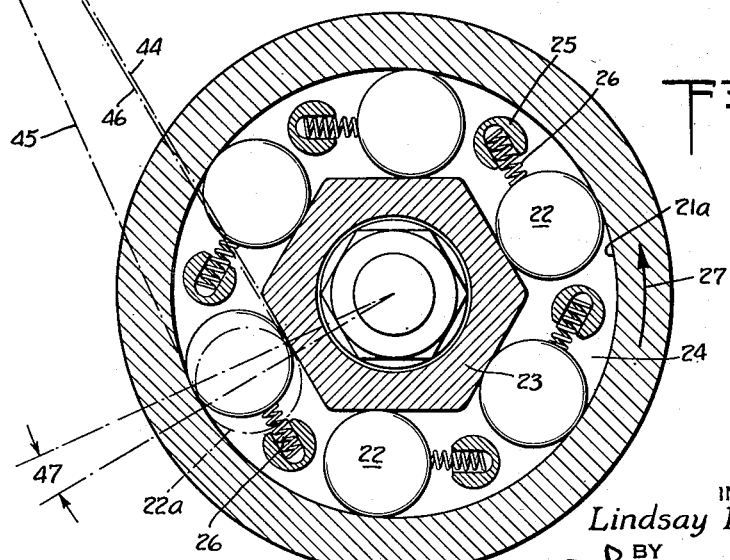
Fig. V
INVENTOR
Lindsay H. Browne
BY
his ATTORNEY

Patented Jan. 25, 1938

2,106,401

UNITED STATES PATENT OFFICE 2,106,401

MOTOR CAR CONTROL DEVICE

Lindsay H. Browne, Rochester, N. Y., assignor, by mesne assignments, to Josiah Anstice & Co. Inc., Rochester, N. Y., a corporation of New York Original application October 16, 1931, Serial No. 569,159, now Patent No. 2,038,983. Divided and this application January 30, 1936, Serial No. 61,485. Renewed June 15, 1937

16 Claims. (Cl. 192—4)

This invention relates to mechanism for the control of power transmission, and in particular the control of connections between the engine or power source in an automobile and the driven wheels, both as to the transmission of power and the interconnections regulating or affecting the relation of relative speeds between the final driven shaft or wheels and the shaft from the source of power, such as the usual engine.

These inventions in one of the preferred forms, consist of a mechanism with coordinated parts and means of control part voluntary and part automatic, to provide in an automobile, with respect to one subject, as a complete result what is now known as automatic free-wheeling and automatic back-rolling stop a combination under single unified control in an automobile, or as to features that may be combined with one part such as the back-roll-stop. In the development of a construction which has solved the problem of a coordinated unit as to control and transmission functioning, for practical manufacture, reliability, simplicity and for practical embodiment with existing standard constructions in automobiles, the combination, as well as various features of the structure are practically usable in other connections, and as to such and as hereinafter claimed certain of the inventions herein are not limited to any specific use or application but may be used solely in relation to the back-roll-stop, or solely in connection with free-wheeling.

This application is a division of my copending application filed October 16, 1931, Serial No. 569,159 which matured as Patent No. 2,038,983 relating to particular features of construction, either involving the combination of free-wheeling and back-roll-stop or features applicable to one of such mechanisms without the other.

The application and use of my invention in an automobile, in any of its preferred forms, embody a unit, or in one sense a coordinated combination of two units, providing for the coasting or free-wheeling of an automobile, that is the over-running of the driven shaft due to a greater speed of rotation when the automobile is moving forward at a speed in excess of the speed of rotation transmitted by the engine, and in the same mechanism means for preventing an automobile from rolling backward when going up an incline, or any similar conditions, by automatically locking the driven shaft against reverse drive motion, and in this combination means of control or for setting the mechanism whereby all normal functions of power transmission, and car movement, are permitted and effected by a single control lever, and more particularly a control lever identical in operation by the driver of the car with the form or forms of control lever which heretofore have only served to shift gear ratios for a predetermined number of forward speeds, or reverse.

This invention will be more fully understood when considering that recently means have been provided for free-wheeling in different forms of construction and involving more or less complication in a transmission mechanism, or as an adjunct, and independenly thereof there have been heretofore suggestions of means to prevent automobiles from rolling backward, which involved sprag bars or ratchets associated with the axles or wheels of vehicles, and some suggestions with respect to their combination with the driven shaft for power vehicles.

The present invention involves the combination in a coordinated mechanism of means for the free-wheeling, back-rolling stop, and a means of control therefor that may be identical with the voluntary control lever operation for any standard transmission mechanism. Thus an ordinary gear shift lever set for forward driving at slow, intermediate and high speeds, accomplishes without any other action of the driver, the simultaneous setting of the mechanism so that it will automatically function for free-wheeling. When the single standard normal gear shift lever is moved to set the transmission into reverse drive, it automatically sets the mechanism to prevent free-wheeling, and simultaneously automatically sets the mechanism to prevent the functioning of the back-rolling stop operation. When moving the single control lever out of reverse position to neutral it leaves the mechanism with neither the back-rolling or the free-wheeling capable of functioning, but assures a positive through drive, from a normal condition of positive control of the vehicle as if the entire mechanism were not embodied. Shifting the transmission control lever to the slow forward speed, or any other forward speed simultaneously or automatically sets the back-rolling mechanism for automatically functioning, and should the car then start on an upgrade it will automatically be prevented from back-rolling, and in fact will be locked against back-rolling, but should the operator for any reason desire to then shift his gears into reverse, the mechanism is such that the operator's voluntary action instantly and readily releases the back-stop, and puts the reverse drive control into normal functioning. It may also, and automatically, negative the free-wheeling functioning of the device. Should the transmission lever be in position setting the reverse drive condition, the lever may be shifted into neutral position without affecting any change of the mechanism, that is, it will still keep the automatic back-rolling means out of functioning, and will also keep the free-wheeling mechanism out of functioning position, thereby permitting the car to be manipulated normally, namely, to be rolled forward or backward as desired. When having once shifted the gear change transmission lever, or a single lever provided in this combination for the purpose, so that forward drive at any of the predetermined speed ratios is set, the back-rolling mechanism is set on forward car-rolling to automatically function. As to the free-wheeling the mechanism is susceptible of two conditions as may be desired, namely, in the preferred form a separate voluntarily operated rod or lever accessible to the driver may be pulled or shifted, and instantly throws the free-wheeling mechanism in a condition to automatically function so long as forward drive of power continues,—or the mechanism may be so arranged that with the setting of forward speeds the free-wheeling is simultaneously prevented from automatically functioning. By this combination the definite position of the free-wheeling mechanism is positively under the control of the operator so that he may set the mechanism to function automatically, or may voluntarily, at any time of forward drive make an independent voluntary movement to negative the functioning of the free-wheeling.

It will be understood that besides simplicity, compactness and the proper coordination of the mechanism, it is essential that the operator shall at all times be able to assure positive control of the car. He may wish to use his motor for retarding or braking purposes; he may have to release his automatic back-rolling lock quickly or instantly, to meet desired or emergency condition of operation; the mechanism must function in a fool-proof manner so that no forgotten movement by the operator, or forced movement by the operator will cause a setting or automatic condition of functioning that would leave the car out of positive control by the operator.

All of these conditions are met in forms of the invention herein shown or described to provide essentially and particularly advantages of free-wheeling or back-rolling control in an automobile. Some of the features or combinations may give the comparable advantageous results in other applications where suitably combined or adapted.

A particular embodiment of my invention for use in self-propelled vehicles will now be described with respect to a form or design shown in the accompanying drawings, in which:

Fig. I is an elevation in arbitrary vertical section, part fragmentary, generally on the axis of the transmission shaft in an automobile showing the coordinated parts of gear shift control and free-wheeling and back-stop control mechanism.

Fig. II is a section in part fragmentary, on the axis of the combined free-wheeling and automatic back-stop mechanism, on a larger scale.

Fig. III is a side elevation, part section, of the combined control means for gear shift, free-wheeling and back-stop mechanism, on a larger scale.

Fig. IV is a cross-section in the plane IV—IV of Fig. II, showing on a still larger scale the back-rolling, clutching or stop mechanism.

Fig. V is a transverse section in the plane V—V, Fig. II, of the main parts of the free-wheeling mechanism, on the same scale as Fig. IV.

In the particular embodiment of my invention herein illustrated, there is shown in Fig. I the combined free-wheeling couple A and back-stop couple B in a housing attached to the housing of a slide gear transmission C, in which typical cooperating parts are shown. A single casing will house all of these three parts in still more compact form, in cases of adapting the entire combination and its controlling means for standard construction. As shown, the housing for couple A or B is particularly suited to attach to the end of transmission housing in or substantially in their present form, with such modification as will hereinafter appear for coordinated and interlocking control.

Shaft D is driven from the engine, and E is the driven shaft such as the propeller shaft extending to the worm or gear drive at the differential of the rear axle. The inter-control means F provides for the proper coordinated shifting of the couples A and B and the change gear shifting, and it will be noted in the form shown that the single means, such as the ordinary gear shift lever G, by its regular or standard movements of gear shifting, for forward or reverse, automatically effects the desired changes in the setting of the control of the free-wheeling and back-stop couples A and B.

For the purpose of illustration only essential elements as gears and parts, of a typical sliding gear transmission are shown, as the construction within the gear box may be varied in many respects. For the purpose of the coordinated structure involved in this application, the gear change lever G engages in the usual manner a shifter-bar 1 or the shifter-bar 2, each having the shifting fork 1a or 2a with its usual engagement to shift the gear couples 3 or 4. The fork grooves also accommodate forks 5—6 which are carried on a shifter-bar 7 and adapted to longitudinally move shifter-bar 7 which extends parallel to the main drive shaft and parallel to the axis of the free-wheeling and back-stop couples A and B. This shifter-bar 7 has fork 8 engaging the hub of the free-wheeling couple member and a second fork 9 engaging a groove on the back-stop couple member. The shifter-bar 7 thus provides the interconnection, and for operation it is supported and adapted to move longitudinally a predetermined short distance and held in either one of two positions by the spring-pressed ball and notches 10. The movement of this shifter-bar 7 is effected by the hub of the fork 5 engaging the collars 5a, or by movement in the opposite direction pulling the link 5b to shift the lever 5c with its fork engaging the pin 5d on the end of the shifter-bar 7, so that movement of the fork 5 in either direction shifts the bar 7 only in one direction, and thereby moves the collars 8a and 9a so that the forks 8 and 9 may shift to respectively cause functioning of the free-wheeling and the back-stop couples, as more fully described with respect to Fig. III. With the shifting of fork 6 in one direction it moves the collar 6a, and shifting in the opposite direction thereafter moves the collar 6b, the latter movement causing the shifter-bar through the collars 8a, 9a to shift the forks 8, 9 of the couples A and b, so that upon reverse drive setting of the shift gears the free-wheeling is positively cut out, and the back-stop couple is positively cut out, that is prevented from functioning as a back-rolling brake. As at times it is desired to prevent the free-wheeling from functioning, the spring 11 is used to throw the fork 8 when permitted by the movement of the collar 8ª with the bar 7, so that a stop-lug 12 may be set to positively prevent movement of the fork 8 against action of the spring 11, and this means of negativing the throwing "in" of the free-wheeling couple may be voluntarily or otherwise provided for, while in the present embodiment I have shown in dotted lines the linkage 13—13 which serves to actuate the stop-lug 12 through oscillating a shaft 12ª extending to the side of the housing or supported in any suitable manner, the rocking of which is thus effected by the movement of the rod 14, the upper extension of which is shown fragmentary beside Fig. I, indicating the lever or button 15 adapted to be pushed down or pulled up about the fixed pivot 16 on a suitable fixed member 16ª, subject to definite voluntary control. The arrangement in this form brings the free-wheeling cut-out control adjacent the gear shift lever, in order that the instinctive movements of a driver in handling a gear shift lever will lead to readily noting and readily manipulating by the same hand the means for throwing "in" or throwing "out" of the free-wheeling couple. Such cutout control, voluntarily actuated, may also be interconnected to hold the set-out position of the back-roll-stop shifted into out-of-functioning position.

As shown in Fig. III, the control shifter-bar 7, interconnecting the transmission and the free-wheel and back-stop couple controls is shown in a position in which the transmission has been shifted to second forward speed, so that fork 5 through links 5ᵇ, 5ᶜ and its forked end has shifted the pin 5ᵈ by engagement with the end of the slot in the fixed support 5ᵉ mounted on the housing, and supporting the rocker pivot of the link 5ᶜ. The slot in this fixed support permits the pivot of the rocker link 5ᶜ to shift when fork 5 is moved into neutral or high gear position, without affecting any movement of the shifter-bar 7. As shown in this figure the bar 7 has been moved to the left, thereby moving collars 8ª and 9ª so that the spring 11 due to its initial compression forces the hub of the fork 8, and thereby shifts the sliding member of the free-wheeling couple into the "in" position, namely, setting the free-wheeling couple for functioning. In this position the stop-lug 12 has been moved by the linkage under control of the driver, so that it does not interfere with the automatic functioning of the control effected by the shifter-bar 7. Simultaneously the movement of the collar 9ª permits the movement of the fork 9 to the "in" position of the back-stop couple, and the rotating grooved member or floating ring controlled by this fork 9 then is free of the shifter-bar control and may shift into the back-stop functioning position in view of the spring control of the members of the couple and cooperation of the interengaging parts of the couple, as more particularly described hereafter.

In Fig. III the various positions of gear shift controlled forks, and the free-wheel and back-stop forks are clearly indicated, and from this it will be seen that when fork 5 is shifted by a change from second to neutral there is no positive movement imparted to the shifter-bar 7 which is held by the positioning spring-ball and notch 10 without change, and shifting the transmission to high speed also causes no engagement by the hub of the fork 5, so that no change takes place, and with high speed the free-wheeling and back-stop functioning remains effective. It will be seen that if fork 5 is in neutral and fork 6 moved into first speed position, it engages no collar and does not disturb the longitudinal position of the shifter-bar 7, but on the contrary when shifter-bar 6 is moved into reverse position it immediately throws the shifter-bar to the right and positively cuts out the back-stop functioning, and likewise cuts out the free-wheeling functioning, so that as soon as the reverse speed is set, while the main driving clutch is open, the entire transmission will be ready to let in the driving clutch for the reverse or rearward driving of the car. When desired the action of setting the transmission into reverse may be so timed as to throw out the reverse or back-rolling stop couple in advance of any engagement of the main clutch while the reverse gear drive is in mesh, which, however, is unnecessary in any ordinary manipulation of a car.

The position of the shifter-bar 7 shown in Fig. I, is held by the positioning spring-ball pin with both free-wheel or back-stop couples "out", as would be the case with transmission gear forks 5—6 both in neutral position, and a condition which has been effected by having thrown the fork back to neutral, under which condition both of the supplementary couples A and B, are intended to remain out of action. As there shown the voluntary means for negativing the movement of the free-wheeling fork 8 is also set so that free-wheeling is prevented unless specifically desired by the operator and effected by a positive movement of the control-button or knob 15. The shifter-bar is supported in bearing 17 at the junction of the housings, or in any suitable member in a single unified housing, and at its rear end in a bearing 18 which readily provides for capping the end and protecting the positioning ball, though various other supports may be provided in order that positive control for the limited longitudinal shifting of this bar may be accommodated and its constant desired functioning assured by proper oiling within the housing.

The free-wheeling and back-stop couples A and B will be more fully understood with reference to Fig. II, in which the shifter-bar 7 actuates the fork 8 which engages the annular groove in the sliding member 19, having peripheral teeth 19ª adapted to engage and lock as a clutch with the internal teeth 20 on the member 21 constituting an outer clutching member, with the face 21ª engaging the rollers 22, as shown in section Fig. V, which rollers also engage the hexagonal faced hub 23 which is splined and locked to the drive shaft D extension from the transmission. The hexagonal faces on 23 have an adjacent flange 24 on which studs or abutments 25 are carried and support springs 26, pressing the rollers 22 in one direction,—so that when the clutch teeth 19ª are not in mesh with the internal teeth 20, the member 21 can over-run the hub 23 when moving in the direction shown by the arrow 27 in Fig. V, because the rollers will move as shown in the dot and dash line 22ª by a slight compression of the springs 26, thus preventing any locking between the rollers and the surface 21ª and the hexagonal surface of the hub. On the contrary, when the relative movement is in the opposite direction the springs cause the rollers 22 to take their locking position, and thereby provide for a positive clutching when the engine is driving the shaft D faster than the movement of the parts due to the rolling of the vehicle by its momentum or inertia.

The drive connection from the free-wheeling ring 21, to the final driven shaft E is caused by the bolting together of ring 21 by bolts 28 through the segments 29 forming a part of the flange 30, which is a part of the stub shaft 30ª or an integral portion of the end of the driven shaft E. Within this stub shaft 30ª is a close fitting but rotarily slightly movable nested stub shaft 31, having hexagonal faces 32 and engaging each face a roller 33 adapted to lock the face with an outer locking ring 34, which is a fixed or stationary ring suitably anchored to the housing to withstand the strain of resisting the back-rolling tendency of the shaft E, subject to the effect of the weight of the car tending to roll backward on an incline. This fixed ring may be lugged into the housing as by studs 34ª, or otherwise supported with a large frictional contact with the inside of the housing, to give it the desired rigidity. The co-acting of the fixed ring with rollers 33 and the hexagonal faces 31ª on the hub 31 depends upon the relative position of the rollers with respect to the angular position of the locking faces 32, and this is effected by having each roller spring-pressed in one direction by the springs 35 mounted in the abutments 29, rigidly supported with respect to the flange 30 and the drive ring 21, and then providing for a limited relative rotary movement of the stub shaft 31 with respect to the shaft 30ª forming the end of the driven shaft E, so that as shown in Fig. IV the locking will be effective when the hexagonal faces 32 are as shown in the full line position, and the locking will be ineffective when the hub 31 and the hexagonal faces 32 are slightly displaced rotarily, as indicated by the arrow 36, into the dot-and-dash position, because in such position the space between the hexagonal faces and the inner surface of the fixed ring 34 will be greater than the diameter of the rollers 33, in the position in which the rollers are then pressed by the springs 35, namely, to a limited position fixed by their contact with the face of the abutments or spacers 29 rotating with the flange 30 and the ring 21. Thus in the latter position, effective in reverse drive of a car, the power transmitting shaft drive will be free to rotate in the reverse direction.

The functioning and control of the back-stop couple, positive for release and automatic for setting, will be understood from the accompanying drawings showing one form in which the setting of the hexagonal faced hub 31 is accomplished by a series of balls of which one is shown at 37, each ball arranged to engage an individual recess 38 in the stub shaft 31, and simultaneously to engage the walls of a recess or hole 39 in the stub shaft 30ª. In such engaging position, shown in Fig. II, the relative position of recesses is such that the positive ball-engagement, that is when forced radially inward, locks the hub of locking stub 31 in the position rotarily as shown in full lines in Fig. IV, namely, to functioning as a clutch to prevent back-rolling. When such functioning of back-stop couple B is not desired, the balls 37 are released from their locking position by the lateral retraction of the shifting or floating sleeve 40, which has a recess 41 cut in its internal face adjacent each of the balls 37, a portion 41ª of which recess for first engagement with the balls is at an angle of approximately 45 degrees, in order to easily engage with a predetermined limited reaction, while the remaining internal face 41ᵇ of the recess 41 is formed at an angle of about 10 degrees, in order to provide the required reaction to force the balls radially inward with a positive locking grip between the stub shaft 31 and the end 30ª of the driven shaft. This floating ring 40, as shown in Fig. I, has released the balls so as to permit the relative slight rotary movement of the hub of clamping stub 31, while in the position shown in Fig. II the balls are shown in fixed position, and this is effected in the embodiment illustrated by the lateral movement of the floating ring 40 by a plurality of springs 42 supported in recesses of the ring and carried by studs 43 mounted on flange 30, the springs functioning when they over-balance the reaction to radial movement of the balls due to the interrelation of the other parts.

In this manner the movement of the fork 9 by the shifting of the bar 7, positively retracts the floating ring 40, so that the balls 37 are free to move radially outward, and due to centrifugal force as well as the non-locking and unlocking or release from the pressure of the riding-face 41ᵇ on the floating ring, the hub or locking stub 31 freely floats into a non-locking position of its hexagonal faces 31ª. When, however, the control bar or rod 7 is moved so that collar 9ª recedes from the hub of the fork 9, then the springs 42 tend to cause the lateral movement of the floating ring 40, and with the engagement of the inner faces adjacent the balls 37 the positive interlocking of the member 31 with stub shaft 30ª is immediately effected.

The relative positions of the hexagonal locking members either for the free-wheeling or the back-locking, are most practical in the form and relative dimensions as approximately shown in Figs. IV and V, though other polygonal faced members may be used suitably designed therefor. As shown in Fig. V, it will be seen that the changed position of the face engaging one of the rollers, in the case of the free-wheeling clutch, effect a positive locking between the surfaces, as indicated by line 44 and the tangent 45 of the inner surface of the ring, whereas with the over-running action driving the rollers against the springs 26, the rollers' periphery in the line 46 is freed from locking contact with the face of the hexagonal member when the roller moves to the position 22ª,—and this relative movement of each roller is indicated by the angle 47, thus indicating the very small relative angular movement required to cause the hexagonal face roller-clutch to lock or to disengage completely.

Having thus described all of the details of construction of a particular embodiment of my invention in the form illustrated herewith, it will be noted that when such structure is embodied in an automobile, the driver utilizes or controls the mechanisms involved by solely operating the gear shift lever G. The driver's operation is the normal operation of the gear shift lever and by the interconnections that single lever with which every car operator is familiar, effects all of the advantageous functions, properly interlocked and foolproof, of free-wheeling and back-rolling stop, properly interdependent with the change speed mechanism. However, he is also given one additional voluntary operation, namely, by the button or knob 15 by which at will he can negative the free-wheeling under conditions he might desire.

It will be noted also that under certain circumstances a different arrangement of control may be desired, and, for example, I may provide a separate lever to move the shifter-bar 7 without an interlocking with the shifting gear transmission parts, so that by such independent lever the back-stop and free-wheeling may be simultaneously thrown in for functioning, or simultaneously thrown out. Or such an independent control of the free-wheeling and back-stop couples may be subject only to an interconnection effected by throwing the power transmission into reverse gear, so that when set to drive the car backward these supplementary coupling means are automatically thrown out and locked out against functioning. The control of the mechanism either all automatic interlocking, or part voluntary, I prefer to have subject to the driver's control in a manner that gives him at all times evidence of the condition of the supplementary couples, and in particular to keep the driver constantly warned of the fact when the free-wheeling is set in functioning position, and to provide for quick and positive negativing of the free-wheeling, in order that whenever desired the coupling of the transmission shaft, that is positive connection between the engine and the driven wheels can be assured for the purpose of using the retarding effect of the engine when going down hill, at any time desired.

It will be understood that for purposes of illustration, the shift gear transmission typical elements have been shown, but the general practice involves the usual clutch between the engine and the transmission, released in the usual way for changes of the gear ratios; also that speed control by the throttle is effected, and will be manipulated in conjunction with the free-rolling speed of the car when it is desired to bring the engine speed in unison with, or exceeding the speed due to the momentum or gravity. These and various other features of coordination in the practical use of my inventions will be evident to one skilled in the art.

I have therefore illustrated only essential parts for the interlocking functioning between the transmission, free-wheeling and back-stop couples, in the accompanying drawings.

It will be noted, however, that in my preferred form the back-locking and free-wheeling couple are placed to the rear of the transmission, so that no load or strain due to braking or locking against back-rolling is transmitted to the gear shifting system. While preferably adjacent the change speed housing or embodied with it, the additional mechanism comprising these couples may be adapted to existing cars, but beyond the transmission and in front of the rear axle drive, the adaptation may be variable depending upon the details of existing constructions.

Many variations may be made in the designing or the embodiment of these inventions with any particular form of transmission, while their particular efficacy resides in the combination of these inventions with what is now generally known as a standard gear shift system, and therefore its coordination therewith has been fully illustrated and described, but may be adapted in different ways. Modifications of the invention may be readily made to suit any variations of the standard parts of the transmission mechanism, the embodiment in two housings as illustrated has its advantages, but the entire interconnected structure may be built into one housing. Features of the invention may also be separately embodied or arranged, and variations may be made in the interconnection and interlocking and automatic features of functioning or control, without departing from my invention.

What I claim and desire to secure by Letters Patent is:

1. In combination in a self-propelled vehicle transmission mechanism, means for permitting rotative over-running of the driven shaft with respect to the power driving shaft when driving or set to drive the vehicle in a forward direction, means to automatically prevent back-rolling of the vehicle and interconnections for preventing the functioning of the back-rolling locking means, and simultaneously preventing the free over-running of the driven shaft or preventing the free over-running without change of the back-rolling means.

2. In an automobile transmission the combination of means to permit free-wheeling when the transmission is set to any one of the positions for transmitting power for forward drive, means simultaneously set for functioning to prevent back-rolling of the car, and means to negative the free-wheeling without changing the back-rolling means.

3. In an automobile transmission having forward speed and reverse mechanism, shifting control means therefor, means coordinated with said shifting control means to permit forward free-rolling and separately to control a back-rolling lock and interconnected cooperating mechanism to automatically permit selectively functioning of either the free-wheeling or back-rolling lock or to voluntarily prevent both from functioning or prevent functioning of one.

4. In an automobile transmission mechanism having a plurality of forward and reverse speed gear changes, means to prevent back-rolling of the automobile normally set for automatically functioning at any forward power driving gear shift position, means for free-wheeling automatically set to functioning on shifting into any one of the forward gear drive connections of the transmission, and means for voluntarily at any time negativing the free-wheeling means while maintaining the back-locking mechanism in functioning position.

5. In an automobile transmission mechanism, means to permit or to prevent free-wheeling, means to automatically function to prevent back-rolling, control means whereby the free-wheeling is prevented from functioning when the transmission is set for any forward speed, and having coordinated means to voluntarily permit free-wheeling at any time when the transmission is set for forward speed, independent positive means to instantly negative the functioning of the back-rolling prevention means, and automatic means preventing the free-wheeling when the back-rolling means is negatived.

6. In an automobile transmission mechanism having a plurality of forward drive and reverse change gear couples and means to voluntarily shift the same, means to permit free-wheeling upon over-running of the automobile speed with respect to the speed of the driving shaft, means automatically functioning to prevent and lock the automobile against back-rolling, cooperating control means for shifting the power transmission into reverse drive of the automobile and cooperating means to automatically prevent the free-wheeling device from functioning and simultaneously prevent back-rolling lock from functioning, and means to positively release the back-rolling stop from functioning without setting the free-wheeling.

7. In an automobile power transmission mechanism having a combined free-wheeling and back-stop couple, a ring anchored to resist rotation and a rotatable housing respectively for the back-lock and free-wheeling, each having a plurality of rollers and an internal polygonal faced hub said rollers being adapted to interlock with said internal polygonal faced hubs respectively coordinated transmission rotative members, and means for shifting one of said polygonal faced hubs differentially with respect to the rotative members to cause locking of the back-stop mechanism with respect to said ring anchored to resist rotation, and means for locking the rotatable housing rigidly with the rotative negativing the functioning of over-running of said ring with respect to the associated rotative members.

8. In an automobile transmission power mechanism with free-wheeling and back-rolling stop couples, a polygonal faced member secured to the driving shaft and associated rollers radially disposed thereon and engaging a cylindrical surface on the driven shaft permitting over-running in one direction, a clutch adjacent thereto cooperating to directly couple the driving to the driven shaft, a one-way clutch adapted to lock the driven shaft against reverse rotation, and means to assure cooperation of the latter whenever the free-wheeling clutch is set for functioning, and means to negative the locking action of the reverse back-rolling lock.

9. In an automobile power transmission, a speed change gear shifting system and a combined free-wheeling and back-stop system adjacent thereto aligned with the axis of the driving and driven shafts, interconnecting control including a single shifter-bar actuating the means for free-wheeling or coupling and for back-stop setting actuated by the members shifted for changing transmission gear ratios, means for independent control of the functioning of the back-stop system, whereby the single gear shift lever movement controls through said shifter-bar cooperation of the free-wheeling and back-lock mechanism functioning dependent upon the gear shifting or independently only the back-stop mechanism.

10. An automobile transmission system having shifting gear change speed and a couple permitting free-wheeling and a couple permitting locking of the reverse movement of the driven shaft, separate control means for each of said couples and means for interlocking said two control means therefor including longitudinally shifting bar means subject to actuation by the movement in either direction of any gears shifted in the transmission, and actuating means automatically coacting with said gear shifting means to negative the free-wheeling or to negative the back-rolling stop, including means for automatically rendering the free-wheeling couple operative for free-wheeling and voluntary means to prevent the free-wheeling from being automatically caused to operate.

11. An automobile transmission having a sliding gear change system and free-wheeling and back-rolling stop couples, a shifter-bar for simultaneously negativing the action of the free-wheel couple and to positively release and instantly negative the back-stop couple, means for shifting the same with the shifting of the change speed gears to reverse position and means to set the back-rolling stop couple to function when any of the forward speed gears are shifted without setting the free-wheeling couple to function.

12. In an automobile transmission, a free-wheeling and a back-stop couple, a single means for simultaneously setting both couples in functioning position, and means for alone setting the back-stop and not the free-wheeling couple.

13. In an automobile transmission, a free-wheeling and a back-stop couple, a single means to lock both couples out of functioning position, and means to lock out the free-wheeling alone and not the back-stop.

14. In an automobile transmission system having a forward and reverse drive speed change mechanism, means to automatically prevent back-rolling whenever the speed change mechanism is set for and forward movement of the automobile has started, means for permitting free-wheeling and a voluntary control device for preventing said last named means from functioning, and cooperating control devices automatically actuated when the power transmission mechanism is set for reverse drive to lock out the free-wheeling and voluntary means to positively and instantly prevent the functioning of the back-roll preventing means.

15. A control system for a gear transmission, a free-wheeling unit and a no-back unit, said control system having two shifter rods and means adapted to them so that one of said rods may render the two said units operative and the other of said rods render them inoperative.

16. A control system for a gear transmission, a free-wheeling unit and a no-back unit, said control system having two shifter rods, one of said rods being adapted to shift the low and reverse gears and the other of said rods being adapted to shift the second and high gears; means attached to the first said rod for rendering the said free-wheeling and no-back units inoperative when the said rod is shifted to the reverse position, and means attached to the second of said rods for rendering the two said units operative when the said rod is shifted into the position of second gear.

LINDSAY H. BROWNE.